(12) United States Patent
Lance

(10) Patent No.: US 7,525,033 B2
(45) Date of Patent: Apr. 28, 2009

(54) KARAOKE SYSTEM WHICH DISPLAYS MUSICAL NOTES AND LYRICAL CONTENT

(76) Inventor: Lisa Lance, 559 Black Bay Road P.O. Box 26, Petawawa, ON (CA) K8H 2X1

( * ) Notice: Subject to any disclaimer, the term of this patent is extended or adjusted under 35 U.S.C. 154(b) by 31 days.

(21) Appl. No.: 11/674,857

(22) Filed: Feb. 14, 2007

(65) Prior Publication Data
US 2007/0186755 A1    Aug. 16, 2007

(30) Foreign Application Priority Data
Feb. 14, 2006    (CA)    .................. 2537108

(51) Int. Cl.
G09B 15/00    (2006.01)
G09B 15/02    (2006.01)
G10H 1/00    (2006.01)

(52) U.S. Cl. .............. 84/477 R; 84/600; 84/609; 84/610; 84/634; 84/649; 84/650

(58) Field of Classification Search .............. None
See application file for complete search history.

(56) References Cited
U.S. PATENT DOCUMENTS
5,510,573 A * 4/1996 Cho et al. .................. 84/610
5,684,262 A    11/1997 Nakamura et al.
2003/0026595 A1 *    2/2003 Ikeda ..................... 386/96
2004/0011188 A1    1/2004 Smith
2006/0032362 A1 *    2/2006 Reynolds et al. ........... 84/601
2006/0288842 A1 *   12/2006 Sitrick et al. ............ 84/477 R
2007/0218444 A1    9/2007 Konetski et al.
2007/0292831 A1   12/2007 Lee

* cited by examiner

*Primary Examiner*—Marion T Fletcher
(74) *Attorney, Agent, or Firm*—Schmeiser, Olsen & Watts

(57) ABSTRACT

A karaoke system which displays and highlights musical notes and tablature, in addition to lyrics, as they are to be played or sung, with a view to helping an aspiring musician learn to play their instrument of choice. The system further utilizes a means to slow the tempo of the songs being played, so that the aspiring musician can master the notes and timing of the songs. The system can be patched to any TV system or displayed on the screen of the system itself The system contains an amp which allows for the plugging in of electric instruments and features a built in microphone. The system further allows a musician the option of a "full band" backup when the song is played, or the option of hearing only the selected instrument while playing along. Compact disks can be provided which would contain the songs, musical notes, lyrics and back up music thereon.

18 Claims, 2 Drawing Sheets

KARAOKE SYSTEM WHICH DISPLAYS MUSICAL NOTES AND LYRICAL CONTENT

This invention relates generally to multimedia entertainment systems, and more particularly to karaoke systems.

DESCRIPTION OF THE PRIOR ART

Karaoke is a form of entertainment, originating in Japan, that features a live singer with pre-recorded accompaniment. In typical Karaoke applications, the lyrics of the song being sung are displayed at the bottom of the screen to assist the viewer in singing along with the music or song, the lyrics frequently being highlighted as they are to be sung. Karaoke music was originally recorded on audio tape, but quickly evolved with the advent of the compact disk, which not only allows rapid, non-serial access new songs, but which also can include multimedia effects such as video and lyrics. Therefore, the advent of the compact disk made it possible to enhance the karaoke experience with video scenes synchronized with the music and the accompanying lyrics. However, in typical karaoke applications and systems, which include both traditional systems and more recent ones which utilize compact disks, visual and video effects (such as video imagery) and lyrics are typically displayed, but not the display and highlighting of musical notes and tablature.

Thus, there is a further need for an improved karaoke system which can provide users with a karaoke system which displays and highlights musical notes and tablature, in addition to lyrics, as they are to be played or sung, with a view to helping an aspiring musician learn to play their instrument of choice. In this regard, the present invention substantially fulfills this need.

SUMMARY OF THE INVENTION

It is an object of the present invention to provide an improved karaoke system which can provide users with a karaoke system which displays and highlights musical notes and tablature, in addition to lyrics, as they are to be played or sung, with a view to helping an aspiring musician to play their instrument of choice.

It is another object of the present invention to provide an improved karaoke system which utilizes a means to slow the tempo of the songs being played, so that the aspiring musician can master the notes and timing of the songs.

It is a further object of the invention to provide an improved karaoke system which can be patched to any TV system or displayed on the screen of the system itself, and which contains an amp which allows for the plugging in of electric instruments, a built in microphone, and which further allows a musician the option of a "full band" backup when the song is played, or the option of hearing only the selected instrument while playing along.

It is yet a further object of the present invention to provide an improved karaoke system which utilizes and plays compact disks which would contain songs, musical notes, lyrics and backup music thereon.

According to one aspect of the present invention, there is provided a karaoke system for use by a user in effecting a karaoke performance of a selected song comprising a display unit; a main unit operatively connectable to the display unit, wherein the main unit allows the user to selectively choose any one of a plurality of karaoke options to perform the selected song, the karaoke options including: (a) a first karaoke mode wherein the main unit simultaneously outputs lyrical image data for displaying words of the song on the display unit and plays the song; (b) a second karaoke mode wherein the main unit simultaneously plays a melody of the song and outputs the lyrical image data for displaying words of the song and musical notation data for displaying musical notes for a selected instrument used in the song on the display unit; (c) a third karaoke mode wherein the main unit outputs the musical notation data for displaying the musical notes for the selected instrument used in the song on the display unit; (d) a fourth karaoke mode wherein the main unit plays the melody of the song, and simultaneously outputs to the display unit the musical notation data for displaying the musical notes for the selected instrument used in the song, whereby the user can play the selected instrument along to the song; and (e) a fifth karaoke mode wherein the main unit plays the song, and simultaneously outputs to the display unit the lyrical image data for displaying words of the song and the musical notation data for displaying the musical notes for the selected instrument used in the song, whereby the user can play the selected instrument along to the song, and whereby tempo adjustment means are provided on the main unit for allowing a user to adjust each of a rate at which the musical notation data is displayed on the display unit and at which the song is played.

According to another aspect of the present invention, there is provided a karaoke system for use by a user in effecting a karaoke performance of a selected song comprising a display unit; a main unit operatively connectable to the display unit, wherein the main unit allows the user to selectively choose any one of a plurality of karaoke options to perform the selected song, the karaoke options including: (a) a first karaoke mode wherein the main unit simultaneously outputs lyrical image data for displaying words of the song on the display unit and plays the song; (b) a second karaoke mode wherein the main unit simultaneously plays a melody of the song and outputs the lyrical image data for displaying words of the song and musical notation data for displaying musical notes for a selected instrument used in the song on the display unit; (c) a third karaoke mode wherein the main unit outputs the musical notation data for displaying the musical notes for the selected instrument used in the song on the display unit; (d) a fourth karaoke mode wherein the main unit plays accompaniment music of the song, and simultaneously outputs to the display unit the musical notation data for displaying the musical notes for the selected instrument used in the song, whereby the user can play the selected instrument along to the song; and (e) a fifth karaoke mode wherein the main unit plays the accompaniment music of the song, and simultaneously outputs to the display unit the lyrical image data for displaying words of the song and the musical notation data for displaying the musical notes for the selected instrument used in the song, whereby the user can play the selected instrument along to the song, and whereby tempo adjustment means are provided on the main unit for allowing a user to adjust each of a rate at which the musical notation data is displayed on the display unit and at which the song is played.

The advantage of the present invention is that it provides an improved karaoke system which displays and highlights musical notes and tablature for users, in addition to lyrics, as they are to be played or sung, with a view to helping an aspiring musician learn to play their instrument of choice.

Yet another advantage of the present invention is to provide an improved karaoke system which utilizes a means to slow the tempo of the songs being played, so that the aspiring musician can master the notes and timing of the songs.

A further advantage of the present invention is that it provides an improved karaoke system which which can be patched to any TV system or displayed on the screen of the system itself, and which contains an amp which allows for the plugging in of electric instruments, a built in microphone, and which further allows a musician the option of a "full band" backup when the song is played, or the option of hearing only the selected instrument while playing along.

A still further advantage of the present invention is to provide an improved karaoke system which utilizes and plays compact disks which would contain the songs, musical notes, lyrics and back up music thereon.

BRIEF DESCRIPTION OF THE DRAWINGS

A preferred embodiment of the present invention is described below with reference to the accompanying drawings, in which.

DESCRIPTION OF THE PREFERRED EMBODIMENT

In essence, the present invention is a a karaoke system which displays and highlights musical notes and tablature, in addition to lyrics, as they are to be played or sung, with a view to helping an aspiring musician learn to play their instrument of choice. The system further allows a musician the option of a "full band" backup when the song is played, or the option of hearing only the selected instrument while playing along. Compact disks can be provided which would contain the songs, musical notes, lyrics and back up music thereon. A karaoke system according to the present invention will now be described with reference to the accompanying drawings.

Figure 1:
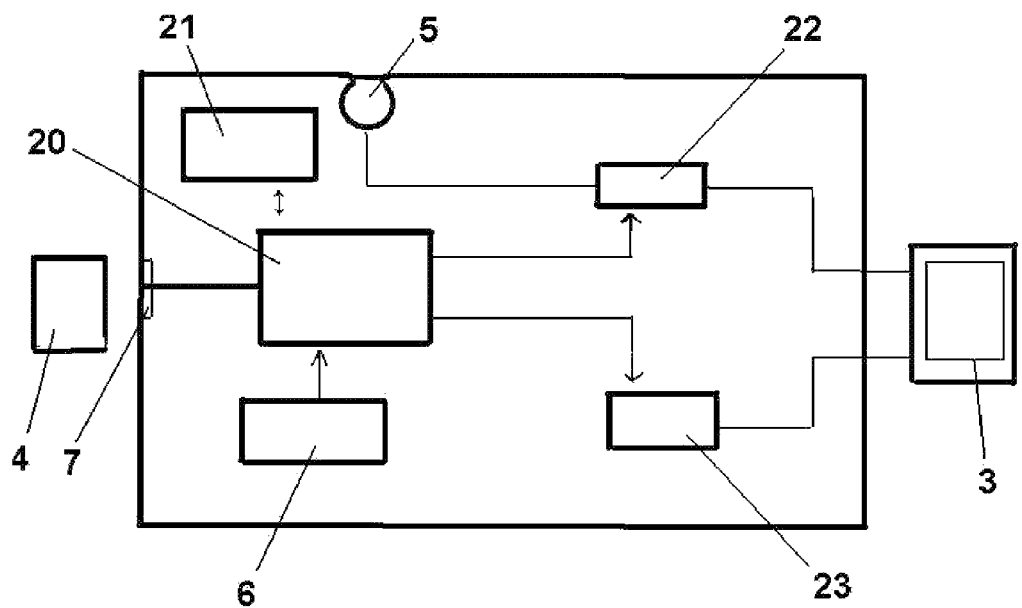
FIG. 1 is a diagrammatic view showing an electrical circuit incorporated in the karaoke system of the present invention.

Referring first to FIG. 1, an embodiment of a karaoke system according to the present invention is illustrated. A karaoke system of the illustrated embodiment can generally include a main unit (1), a TV or video monitor acting as a display unit (3), which is connected to the main unit (1) through, for example, an audio/video cable (hereinafter referred to as "AV cable") (2) or the like, and a compact disk player (4) connected to the main unit. Alternatively, the main unit (1) may be operatively connected to the display unit (3) by wireless, by wire, or, in an alternative embodiment, the display unit can be integrally attached to the main unit, as would be apparent to one skilled in the art.

In FIG. 1, reference numeral (20) designates a control section, which functions to control an audio signal processing section (22) and a video signal processing section (23), according to an operation signal inputted from the operation section (6) and a control program stored in a memory (21) of the main unit (1). In a preferred embodiment, the main unit (1) will have a microphone (5) which can be attached thereto, through which a voice of a user or performer is inputted to the main unit (1) of the karaoke system. In an alternative embodiment, the microphone (5) is integrally incorporated into the main unit (1) itself.

In using the karaoke system of the present invention, the control section (20) is constructed so as to read data from the compact disk player (4) fitted into the main unit (1), for example, by way of connector 7, and to output a performance signal of the music or song selected to the audio signal processing section (22) and also output an image signal indicating a title of the music and words thereof to the video signal processing section (23), along with, in a preferred embodiment of the present invention, an image signal indicating musical notation data for displaying musical notes and tablature of a song on the display unit (3) by way of the AV cable (2). The audio signal processing section (22) is configured so as to subject a voice signal inputted thereto from the microphone (5) utilized by the user and the performance signal of the music or song selected which is outputted from the control section (20) to both mixing and amplification to prepare audio signals, which are then outputted through, in this example, the AV cable (2) to the TV or video monitor (3). The video signal processing section (23) functions to output, in the form of video signals, image information for displaying a title of music, words thereof, musical notes and tablature of a song and the like inputted thereto from the compact disk player (4) to the TV or video monitor (3) through the AV cable 2.

The main unit (1), as noted above, is provided with an operation section (6) which will preferably include a variety of operation keys or buttons. It is, of course, conceivable that the operation section (6) of the main unit (1) can be remotely activated within the main unit (1) by way of, for example, a remote control. The operation section (6) can comprise, for example purposes only, tempo keys or buttons (not shown) for variably controlling a reproducing speed or tempo of music being performed in accordance with the user's choice. In this manner, a user playing a musical instrument along to the song being played by the karaoke system of the present invention, for example, would have the option of "slowing down" the tempo of the song, so as to facilitate mastery of the notes to be played for that song. This also would impress upon the user a sense of the tempo and timing required when playing the musical notes for that song. The operation section (6) can also comprise, for example purposes only, volume keys or buttons (not shown) for variably controlling a volume of a reproduced sound of the music being performed, a cancel key or button (not shown) for canceling various kinds of settings, selection keys or buttons (not shown) used for selection operation, a decision key or button (not shown) for confirming results selected by the selection keys or buttons to be effective, and the like.

The compact disk player (4) has a read only memory (ROM) incorporated therein, through which compact disks can be played which have stored thereon song data on musical pieces for a karaoke performance, musical notation data for displaying musical notes of a song on the display unit (3), and band accompaniment music for that song. In an alternative embodiment, the main unit (1) of the karaoke system of the present invention may utilize an internal memory card or means (not shown) for storing the song data on musical pieces for a karaoke performance, musical notation data for displaying musical notes of a song on the display unit (3), and accompaniment music for various songs.

Now, a manner of operation of the karaoke system of the illustrated embodiment will be described with reference to FIG. 2 by way of example.

Figure 2:
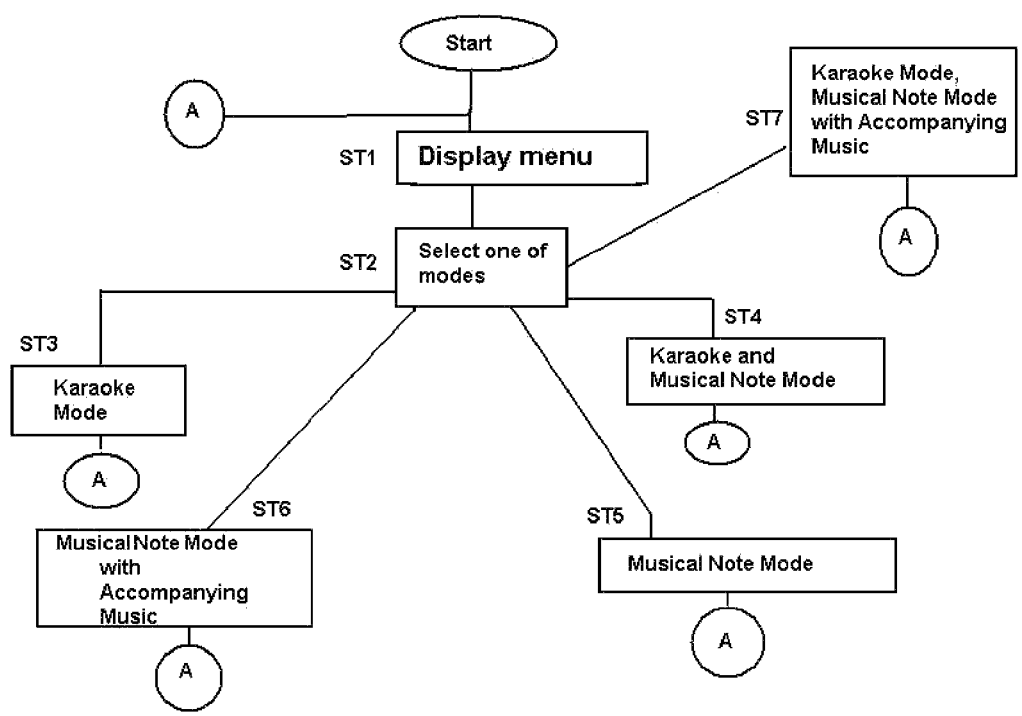
FIG. 2 is a flow chart showing a manner of operation of the karaoke system shown in FIG. 1 by way of example.

First, the compact disk player (4) of the main unit (1) is utilized and turned on by a user, who then utilizes the system, referred to generally as "A" in FIG. 2. This results in a menu image being displayed on the TV or video monitor (3) (a step ST1). The menu image indicates various modes that could be selected by the user. Thus, a user may select desired one of the modes by means of utilizing selection keys or buttons (not shown), and then push the decision key or button (a step ST2) in FIG. 2, to confirm and finalize their selection.

With reference to FIG. 2, when the "karaoke mode" is selected, for example, this entails the user singing along to the song selected, and the operation or procedure is transferred to a step ST3, so that karaoke mode processing may be carried out. In the karaoke mode processing, titles of songs stored are displayed, thus, the user may select a song which he or she desires to sing for a karaoke performance. Then, when the user pushes the decision button (not shown) to finalize their selection, a melody of the song selected is outputted from the TV or video monitor 3 and words thereof are displayed thereon. Thus, the user may sing a song of the piece in accordance with the melody. When performance of the song is finished, the operation is returned to the menu image of the step ST1 in FIG. 2.

With reference to FIG. 2, when the "karaoke and musical note mode" is selected, for example, the operation or procedure is transferred to a step ST4, so that "karaoke and musical note mode" processing may be carried out. In the "karaoke and musical note mode" processing, titles of songs stored are displayed, thus, the user may select a song which he or she desires to sing for a karaoke performance. Then, when the user pushes the decision button (not shown) to finalize their selection, a melody of the song selected is outputted from the TV or video monitor 3 and words thereof are displayed thereon, in addition to the musical notes or tablature of the song. Thus, the user may sing the song of the piece in accordance with the melody, and play along with a musical instrument, if desired. When performance of the song is finished, the operation is returned to the menu image of the step ST1 in FIG. 2.

With reference to FIG. 2, when the "musical note mode" is selected, for example, the operation or procedure is transferred to a step ST5, so that "musical note mode" processing may be carried out. In the "musical note mode" the user may select a song which he or she desires to play along with for a karaoke performance. Then, when the user pushes the decision button (not shown) to finalize their selection, the musical notes or tablature of the song solely are selected is outputted from the TV or video monitor 3 and displayed thereon. Thus, the user may play notes of the song selected with a musical instrument. When performance of the song is finished, the operation is returned to the menu image of the step ST1 in FIG. 2.

With reference to FIG. 2, when the "musical note mode with accompanying music" is selected, for example, the operation or procedure is transferred to a step ST6, so that "musical note mode with accompanying music" processing may be carried out. In the "musical note mode with accompanying music" processing, the user may select a song which he or she desires to play along with for a karaoke performance. Then, when the user pushes the decision button (not shown) to finalize their selection, the musical notes or tablature of the song are selected is outputted from the TV or video monitor 3 and displayed thereon, in addition to the backing music (full band backup) for that song selection being played concurrently. Then, when the user pushes the decision button (not shown) to finalize their selection, a melody of the song selected is outputted from the TV or video monitor 3 and words thereof are displayed thereon, in addition to the musical notes or tablature of the song. Thus, the user may play notes of the song selected with a musical instrument, concurrently hearing the accompanying backing music (full band backup) for that song. When performance of the song is finished, the operation is returned to the menu image of the step ST1 in FIG. 2.

With reference to FIG. 2, when the "karaoke mode, musical note mode with accompanying music" is selected, for example, the operation or procedure is transferred to a step ST7, so that "karaoke mode, musical note mode with accompanying music" processing may be carried out. In the "karaoke mode, musical note mode with accompanying music" processing, titles of songs stored are displayed, thus, the user may select a song which he or she desires to sing for a karaoke performance. Then, when the user pushes the decision button (not shown) to finalize their selection, a melody of the song selected is outputted from the TV or video monitor 3 and words thereof are displayed thereon, in addition to the musical notes or tablature of the song, and in addition to the backing music (full band backup) for that song selection being played concurrently. Thus, the user may sing the song of the piece in accordance with the melody, and play along with a musical instrument, if desired, while concurrently hearing the accompanying backing music (full band backup) for that song. When performance of the song is finished, the operation is returned to the menu image of the step ST1 in FIG. 2.

In another embodiment of the present invention, the main unit (1) can contain an amplifier therein which allows for the plugging in of electric instruments by the user. Thus, when the video signal processing section (23) functions to output, in the form of video signals, image information displaying musical notes and tablature of a song and the like inputted thereto from the compact disk player (4) to the TV or video monitor (3) through the AV cable 2, a user can play their musical instrument along to the song. In another embodiment of the present invention, the notes (or strum patterns, for example, for a guitar) could be highlighted on the TV or video monitor (3) as they are to be played. Of course, the lyrics for the song selected could also be highlighted in this manner concurrently as well, as would be apparent to one skilled in the art. Further, as noted previously, the main unit (1) can be patched to any TV system or monitor, by way of the AV cable (2) or displayed on a screen of the main unit (1) itself.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A karaoke system for use by a user in effecting a karaoke performance of a selected song comprising:
    a display unit;
    a main unit operatively connectable to the display unit, wherein the main unit allows the user to selectively choose any one of a plurality of karaoke options to perform the selected song without saving or editing any aspect of the karaoke performance, the karaoke options including:
    (a) a first karaoke mode wherein the main unit simultaneously outputs lyrical image data for displaying words of the song on the display unit and plays the song;
    (b) a second karaoke mode wherein the main unit simultaneously plays a melody of the song and outputs the lyrical image data for displaying words of the song and musical notation data for displaying musical notes for a selected instrument used in the song on the display unit;
    (c) a third karaoke mode wherein the main unit outputs the musical notation data for displaying the musical notes for the selected instrument used in the song on the display unit, whereby the user can play the selected instrument along to the song;
    (d) a fourth karaoke mode wherein the main unit plays the melody of the song, and simultaneously outputs to the display unit the musical notation data for displaying the musical notes for the selected instrument used in the song, whereby the user can play the selected instrument along to the song; and
    (e) a fifth karaoke mode wherein the main unit plays the song, and simultaneously outputs to the display unit the lyrical image data for displaying words of the song and the musical notation data for displaying the musical notes for the selected instrument used in the song, whereby the user can play the selected instrument along to the song, and whereby tempo adjustment means are provided on the main unit for allowing a user to adjust each of a rate at which the musical notation data is displayed on the display unit and at which the song is played.

2. The karaoke system as defined in claim 1, wherein the main unit further comprises at least one compact disk player for the playing of compact disks therein.

3. The karaoke system of claim 1, wherein the main unit is operatively connectable to the display unit through a wire or by wireless.

4. The karaoke system of claim 1, wherein the display unit is integrally attached to the main unit.

5. The karaoke system of claim 1, further comprising at least one microphone for singing through which at least one singing voice can be input during the karaoke performance of the song, the at least one microphone being detachably connectable to the main unit.

6. The karaoke system of claim 1, wherein the main unit further comprises an amplifier, whereby an electrical musical instrument can be plugged into.

7. The karaoke system of claim 1, wherein each of the rate at which the musical notation data is displayed on the display unit and at which the song is played can be reduced.

8. The karaoke system of claim 1, wherein, after the karaoke performance of the song has concluded, the main unit allows the user to selectively choose a further one of the plurality of karaoke options to perform another selected song.

9. The karaoke system of claim 1, wherein the main unit further comprises a built in microphone.

10. The karaoke system of claim 1, wherein the main unit further comprises memory means for storing the lyrical image data, the melody of the song, and the musical notation data therein.

11. The karaoke system of claim 10, wherein the memory means is operably able to store a plurality of songs therein.

12. The karaoke system of claim 1, wherein the main unit is operatively connectable to the display unit by an audio/video cable.

13. A karaoke system for use by a user in effecting a karaoke performance of a selected song comprising:

a display unit;

a main unit operatively connectable to the display unit, wherein the main unit allows the user to selectively choose any one of a plurality of karaoke options to perform the selected song without saving or editing any aspect of the karaoke performance, the karaoke options including:

(a) a first karaoke mode wherein the main unit simultaneously outputs lyrical image data for displaying words of the song on the display unit and plays the song;

(b) a second karaoke mode wherein the main unit simultaneously plays a melody of the song and outputs the lyrical image data for displaying words of the song and musical notation data for displaying musical notes for a selected instrument used in the song on the display unit, whereby the user can play the selected instrument along to the song;

(c) a third karaoke mode wherein the main unit outputs the musical notation data for displaying the musical notes for the selected instrument used in the song on the display unit, whereby the user can play the selected instrument along to the song;

(d) a fourth karaoke mode wherein the main unit plays accompaniment music of the song, and simultaneously outputs to the display unit the musical notation data for displaying the musical notes for the selected instrument used in the song, whereby the user can play the selected instrument along to the song; and (e) a fifth karaoke mode wherein the main unit plays the accompaniment music of the song, and simultaneously outputs to the display unit the lyrical image data for displaying words of the song and the musical notation data for displaying the musical notes for the selected instrument used in the song, whereby the user can play the selected instrument along to the song, and whereby tempo adjustment means are provided on the main unit for allowing a user to adjust each of a rate at which the musical notation data is displayed on the display unit and at which the song is played.

14. The karaoke system of claim 13, further comprising at least one microphone for singing through which at least one singing voice can be input during the karaoke performance of the song, the at least one microphone being detachably connectable to the main unit.

15. The karaoke system of claim 13, wherein the main unit further comprises an amplifier, whereby an electrical musical instrument can be plugged into.

16. The karaoke system of claim 13, wherein each of the rate at which the musical notation data is displayed on the display unit and at which the song is played can be reduced.

17. The karaoke system of claim 13, wherein, after the karaoke performance of the song has concluded, the main unit allows the user to selectively choose a further one of the plurality of karaoke options to perform another selected song.

18. The karaoke system of claim 17, wherein the main unit further comprises at least one compact disk player for the playing of at least one compact disk therein, the at least one compact disk having stored thereon the lyrical image data, the accompaniment music, the melody of the song, and the musical notation data.

* * * * *